United States Patent
Arianpour et al.

(10) Patent No.: US 11,977,213 B2
(45) Date of Patent: *May 7, 2024

(54) PREDICTIVE FOCUS TRACKING APPARATUS AND METHODS

(71) Applicant: ILLUMINA, INC., San Diego, CA (US)

(72) Inventors: Ashkan Arianpour, San Diego, CA (US); John Bailey, San Diego, CA (US); Dustin Blair, San Diego, CA (US); Xiangling (Steve) Chen, San Diego, CA (US); Stanley S. Hong, San Diego, CA (US); Simon Prince, San Diego, CA (US); Merek C. Siu, San Diego, CA (US); Chunhong (Allen) Zhou, San Diego, CA (US); Danilo Condello, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 425 days.

This patent is subject to a terminal disclaimer.

(21) Appl. No.: 17/339,587

(22) Filed: Jun. 4, 2021

(65) Prior Publication Data

US 2021/0294083 A1 Sep. 23, 2021

Related U.S. Application Data

(63) Continuation of application No. 15/852,699, filed on Dec. 22, 2017, now Pat. No. 11,054,624.
(Continued)

(30) Foreign Application Priority Data

Mar. 24, 2017 (GB) .................................. 1704770

(51) Int. Cl.
*G02B 21/00* (2006.01)
*G02B 7/09* (2021.01)
(Continued)

(52) U.S. Cl.
CPC ............. *G02B 21/002* (2013.01); *G02B 7/09* (2013.01); *G02B 7/102* (2013.01); *G02B 21/006* (2013.01); *G02B 21/245* (2013.01); *G02B 27/16* (2013.01)

(58) Field of Classification Search
CPC .... G02B 21/002; G02B 21/006; G02B 21/00; G02B 21/0004; G02B 21/0016;
(Continued)

(56) References Cited

U.S. PATENT DOCUMENTS 5,404,163 A 4/1995 Kubo
8,809,809 B1 8/2014 Wu et al.
(Continued)

FOREIGN PATENT DOCUMENTS

CN 103592754 2/2014
EP 2383600 11/2011
(Continued)

OTHER PUBLICATIONS

Communication pursuant to Article 94(3) EPC dated Sep. 2, 2021 for European Application No. 17890176.5.
(Continued)

*Primary Examiner* — Stephone B Allen
*Assistant Examiner* — Adam W Booher
(74) *Attorney, Agent, or Firm* — Sheppard, Mullin, Richter & Hampton LLP (57) ABSTRACT

An imaging system may include a sample stage comprising a surface to support a sample container, the sample container including a sample having a plurality of sample locations; an optical stage to image the sample at the plurality of sample
(Continued)

locations; one or more actuators physically coupled to at least one of the sample stage and the optical stage to move the sample stage relative to the optical stage to focus the optical stage onto a current sample location of the plurality of sample locations; a first light source to illuminate the current sample location; a second light source to project a pair of spots on a next sample location of the plurality of sample locations; and a controller to determine, based on an image of the pair of spots projected on the next sample location, a focus setting for the next sample location.

20 Claims, 9 Drawing Sheets

Related U.S. Application Data (60) Provisional application No. 62/442,947, filed on Jan. 5, 2017.

(51) Int. Cl.
*G02B 7/10* (2021.01)
*G02B 21/24* (2006.01)
*G02B 27/16* (2006.01)

(58) Field of Classification Search
CPC ............ G02B 21/0024; G02B 21/0036; G02B 21/0052; G02B 21/008; G02B 21/18; G02B 21/241; G02B 21/245; G02B 7/09; G02B 7/102; G02B 7/04; G02B 7/10; G02B 27/16
See application file for complete search history.

(56) References Cited

U.S. PATENT DOCUMENTS

| | | | |
|---|---|---|---|
| 9,784,594 B2 | 10/2017 | David et al. | |
| 11,054,624 B2 * | 7/2021 | Arianpour | G02B 7/09 |
| 2003/0184855 A1 | 10/2003 | Yasuda et al. | |
| 2004/0129858 A1 | 7/2004 | Czarnetzki et al. | |
| 2005/0099680 A1 | 5/2005 | Knoblich et al. | |
| 2009/0195688 A1 | 8/2009 | Henderson et al. | |
| 2011/0127406 A1 | 6/2011 | Sase | |
| 2015/0022651 A1 | 1/2015 | Wu | |
| 2015/0054921 A1 | 2/2015 | Dixon et al. | |
| 2015/0103156 A1 | 4/2015 | Northrup et al. | |
| 2015/0130920 A1 | 5/2015 | Zou et al. | |
| 2015/0156397 A1 | 6/2015 | Oishi | |
| 2015/0192769 A1 | 7/2015 | Dresel et al. | |
| 2016/0131887 A1 | 5/2016 | Norris et al. | |
| 2016/0370565 A1 | 12/2016 | Bredno et al. | |
| 2016/0376627 A1 * | 12/2016 | Zengler | A23K 50/75 424/93.3 |

FOREIGN PATENT DOCUMENTS

| | | |
|---|---|---|
| EP | 1352283 | 10/2013 |
| GB | 2537786 | 10/2016 |
| JP | 2003295065 | 10/2003 |
| JP | 2010145628 A | 7/2010 |
| JP | 2012523583 A | 10/2012 |
| JP | 2013065015 A | 4/2013 |
| JP | 2016024042 | 2/2016 |
| JP | 2016156950 | 9/2016 |
| WO | WO 2009/127336 | 10/2009 |
| WO | WO 2010/120231 | 10/2010 |

OTHER PUBLICATIONS

Anonymous, "Plane (geometry)—Wikipedia", Retrieved from the Internet: URL: https://en.wikipedia.org/w/index.php?title=Plane_(geometry)&oldid=748738418 [retrieved on Jun. 14, 2019], 9 pages.
International Search Report and Written Opinion dated Apr. 13, 2018 for International Application No. PCT/IB2017/058383, 17 pages.
United Kingdom Search Report under Section 17(5) for Application No. GB1704770.5 dated Aug. 1, 2017, 26 pages.

* cited by examiner

Fig. 9

PREDICTIVE FOCUS TRACKING APPARATUS AND METHODS

CROSS-REFERENCE TO RELATED APPLICATIONS

The present application is a continuation of U.S. patent application Ser. No. 15/852,699 filed on Dec. 22, 2017, issued as U.S. Pat. No. 11,054,624 on Jul. 6, 2021, and entitled "PREDICTIVE FOCUS TRACKING APPARATUS AND METHODS," which claims the benefit of U.S. Provisional Patent Application No. 62/442,947 filed on Jan. 5, 2017 and entitled "Predictive Focus Tracking Apparatus and Methods," which are incorporated herein by reference in their entirety. The present application also claims the benefit of United Kingdom Patent Application No. 1704770.5 filed on Mar. 24, 2017, and entitled "Predictive Focus Tracking Apparatus and Methods," which claims priority to U.S. Provisional Patent Application No. 62/442,947 filed on Jan. 5, 2017 and entitled "Predictive Focus Tracking Apparatus and Methods."

BACKGROUND

Numerous advances in the field of biology have benefited from improved imaging systems and techniques, such as, for example, those used in optical microscopes and scanners. Maintaining accurate focus during imaging using these imaging systems can be important for successful imaging operations. Accordingly, the system is often calibrated for the focal plane prior to system use. However, with larger sample containers, for example, this calibration may be inadequate to account for variations across the area of the sample or samples. For example, consider the case of a sample container having a plurality of samples at various sample locations defined by a set of coordinates. These sample locations can be in different focal planes due to bending or warping, or due to thermal changes or other factors causing irregularities across the sample container. As a result, some systems perform real-time focusing as the scanning operation is performed at various sample locations along the sample container. However, there is latency associated with refocusing the system at each sample location. This latency affects the speed with which various samples within the sample container can be imaged.

SUMMARY

Provided in examples herein are biological analysis instruments. More particularly, various examples describe focus tracking systems and methods for instruments used in analyzing biological samples.

Various examples of the technologies disclosed herein provide systems and methods for reducing latency associated with focus tracking in optical scanners. In some examples, systems and methods are provided to derive focus tracking error signal information for sample locations in advance of reaching those sample locations. This can be accomplished, for example, by adding additional points to the optical system field of view that can be used to look ahead to obtain focusing information for one or more sample locations in a direction or directions of future sample locations to be examined. In other examples, a history file can be generated and maintained for a sample container that includes focusing information for the plurality of sample locations across that sample container. When the sample container is loaded for imaging operations, its associated history file can also be installed to provide focusing information at each of the identified sample locations. In still further examples improved actuators can be used to increase the speed with which focusing is accomplished.

In some examples, an imaging system can include: a sample stage comprising a surface to support a sample container, the sample container having a plurality of sample locations; an optical stage having an objective lens, the optical stage being positionable relative to the sample stage to image samples at the sample locations; an actuator physically coupled to at least one of the sample stage and the optical stage to move the sample stage relative to the optical stage to focus the optical stage onto a current sample location; and a drive circuit to determine a focus setting for a next sample location and to provide a drive signal to the actuator before the optical stage is positioned to image a sample at the next sample location, wherein at least one parameter of the drive signal is determined using a difference between a focus setting for the current sample location and the determined focus setting for the next sample location.

In further examples, a method of focus tracking can include determining a first in-focus position of a sample stage for a current sample location on a sample container being scanned; determining a second in-focus position of the stage for a next sample location to be scanned; computing a difference between the first and second in-focus positions; and sending a drive signal to a stage actuator to move the sample stage relative to an optical stage from the first in-focus position to the second in-focus position at a time t before the stage is positioned to image at the next sample location, wherein at least one parameter of the drive signal is determined using the difference between the first and second in-focus positions.

In still further examples, a method of focus tracking includes: determining a first in-focus position of a sample stage for a current sample location on a sample container being scanned; determining a second in-focus position of the stage for a next sample location to be scanned; computing a slope of the sample container using the first and second in-focus positions; and sending a drive signal to a stage actuator to move the sample stage relative to an optical stage, wherein the drive signal is generated using the slope of the sample container.

It is to be understood that any respective features/examples of each of the examples of the disclosure as described herein may be implemented together in any combination, and that any features/examples from any one or more of these examples may be implemented together with any of the features of the other aspect(s) as described herein in any combination.

BRIEF DESCRIPTION OF THE DRAWINGS

The technology disclosed herein, in accordance with one or more examples, is described in detail with reference to the following figures. These figures are provided to facilitate the reader's understanding of the disclosed technology, and are not intended to be exhaustive or to limit the disclosure to the precise forms disclosed. Indeed, the drawings in the figures are provided for purposes of illustration only, and merely depict typical or example examples of the disclosed technology. Furthermore, it should be noted that for clarity and ease of illustration, the elements in the figures have not necessarily been drawn to scale.

It should be understood that the disclosed technology can be practiced with modification and alteration, and that the disclosed technology be limited only by the claims and the equivalents thereof.

DETAILED DESCRIPTION

Various examples of the technologies disclosed herein provide systems and methods for reducing latency associated with focus tracking in optical scanners. In some examples, systems and methods are provided to derive focus tracking error signal information for sample locations in advance of reaching those sample locations. This can be accomplished, for example, by adding additional points to the optical system field of view that can be used to look ahead to obtain focusing information for one or more sample locations in a direction or directions of future sample locations to be examined. In other examples, a history file can be generated and maintained for a sample container that includes focusing information for the plurality of sample locations across that sample container. When the sample container is loaded for imaging operations, its associated history file can also be installed to provide focusing information at each of the identified sample locations. In still further examples, improved actuators can be used to increase the speed with which focusing is accomplished.

Various examples of the systems and methods disclosed herein can provide a predictive focus tracking system and improved focus actuators that allow increased scan speeds and improved focus control as compared to conventional solutions. For example, the system may be implemented to allow uniform, diffraction limited imaging at high scan speeds, leading to high data acquisition rates. As a further example, some implementations may allow a 4× scan speed, resulting in the scanning of data on the order of 120 Gb/hour. Predictive focus techniques and improved actuator technologies such as those described herein can be used to reduce latency and thereby help to achieve such increased scanning speeds as well as to achieve nanometer scale focusing precision.

Before describing various exemplary systems and methods, it is useful to describe an example environment with which the systems and methods can be implemented. One such example environment is that of an image scanning system, such as that illustrated in FIG. 1. The example imaging scanning system may include a device for obtaining or producing an image of a region. The example outlined in FIG. 1 shows an example imaging configuration of a backlight design.

Figure 1:
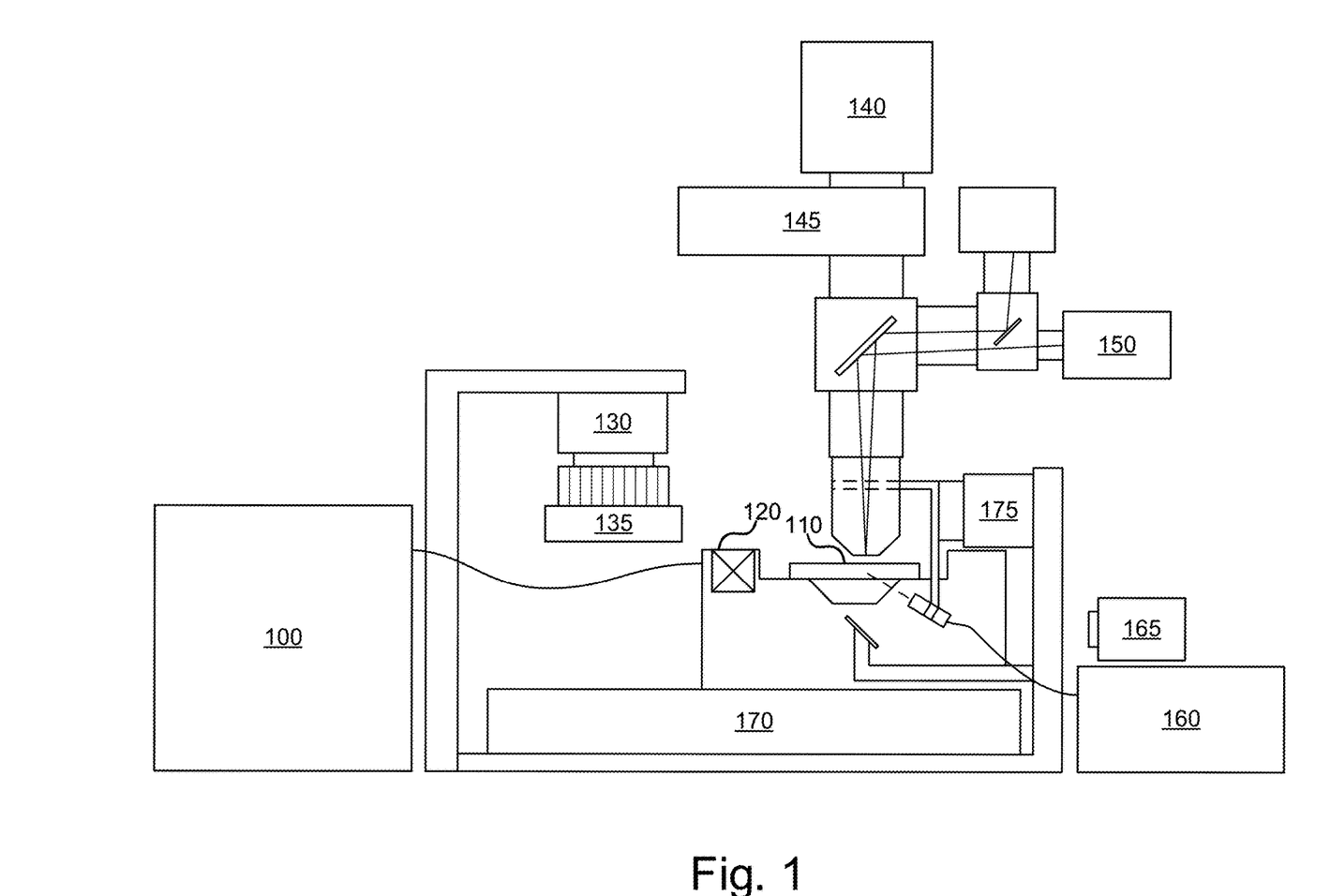
FIG. 1 illustrates a simplified block diagram of one example of an image scanning system with which systems and methods disclosed herein may be implemented.

As can be seen in the example of FIG. 1, subject samples are located on sample container 110, which is positioned on a sample stage 170 under an objective lens 142. Light source 160 and associated optics direct a beam of light, such as laser light, to a chosen sample location on the sample container 110. The sample fluoresces and the resultant light is collected by the objective lens 142 and directed to a photo detector 140 to detect the florescence. Sample stage 170 is moved relative to objective lens 142 to position the next sample location on sample container 110 at the focal point of the objective lens 142. Movement of sample stage 110 relative to objective lens 142 can be achieved by moving the sample stage itself, the objective lens, the entire optical stage, or any combination of the foregoing. Further examples may also include moving the entire imaging system over a stationary sample.

Fluid delivery module or device 100 directs the flow of reagents (e.g., fluorescent nucleotides, buffers, enzymes, cleavage reagents, etc.) to (and through) sample container 110 and waste valve 120. In some applications, the sample container 110 can be implemented as a flowcell that includes clusters of nucleic acid sequences at a plurality of sample locations on the sample container 110. The samples to be sequenced may be attached to the substrate of the flowcell, along with other optional components.

The system also comprises temperature station actuator 130 and heater/cooler 135 that can optionally regulate the temperature of conditions of the fluids within the sample container 110. Camera system 140 can be included to monitor and track the sequencing of sample container 110. Camera system 140 can be implemented, for example, as a CCD camera, which can interact with various filters within filter switching assembly 145, objective lens 142, and focusing laser/focusing laser assembly 150. Camera system 140 is not limited to a CCD camera and other cameras and image sensor technologies can be used.

Light source 160 (e.g., an excitation laser within an assembly optionally comprising multiple lasers) or other light source can be included to illuminate fluorescent sequencing reactions within the samples via illumination through fiber optic interface 161 (which can optionally comprise one or more re-imaging lenses, a fiber optic mounting, etc). Low watt lamp 165, focusing laser 150, and a reverse dichroic are also presented in the example shown. In some applications focusing laser 150 may be turned off during imaging. In other applications, an alternative focus configuration can include a second focusing camera (not shown), which can be a quadrant detector, a Position Sensitive Detector (PSD), or similar detector to measure the location of the scattered beam reflected from the surface concurrent with data collection.

Although illustrated as a backlit device, other examples may include a light from a laser or other light source that is directed through the objective lens 142 onto the samples on sample container 110. Sample container 110 can be ultimately mounted on a sample stage 170 to provide movement and alignment of the sample container 110 relative to the objective lens 142. The sample stage can have one or more actuators to allow it to move in any of three dimensions. For example, in terms of the Cartesian coordinate system, actuators can be provided to allow the stage to move in the X, Y and Z directions relative to the objective lens. This can allow one or more sample locations on sample container 110 to be positioned in optical alignment with objective lens 142.

A focus (z-axis) component 175 is shown in this example as being included to control positioning of the optical components relative to the sample container 110 in the focus direction (typically referred to as the z axis, or z direction). Focus component 175 can include one or more actuators physically coupled to the optical stage or the sample stage, or both, to move sample container 110 on sample stage 170 relative to the optical components (e.g., the objective lens 142) to provide proper focusing for the imaging operation. For example, the actuator may be physically coupled to the respective stage such as, for example, by mechanical, magnetic, fluidic or other attachment or contact directly or indirectly to or with the stage. The one or more actuators can be configured to move the stage in the z-direction while maintaining the sample stage in the same plane (e.g., maintaining a level or horizontal attitude, perpendicular to the optical axis). The one or more actuators can also be configured to tilt the stage. This can be done, for example, so that sample container 110 can be leveled dynamically to account for any slope in its surfaces.

Focusing of the system generally refers to aligning the focal plane of the objective lens with the sample to be imaged at the chosen sample location. However, focusing can also refer to adjustments to the system to obtain a desired characteristic for a representation of the sample such as, for example, a desired level of sharpness or contrast for an image of a test sample. Because the usable depth of field of the focal plane of the objective lens is typically very small (sometimes on the order of 1 µm or less), focus component 175 closely follows the surface being imaged. Because the sample container is not perfectly flat as fixtured in the instrument, focus component 175 may be set up to follow this profile while moving along in the scanning direction (typically referred to as the y-axis).

The light emanating from a test sample at a sample location being imaged can be directed to one or more detectors 140. Detectors can include, for example a CCD camera. An aperture can be included and positioned to allow only light emanating from the focus area to pass to the detector. The aperture can be included to improve image quality by filtering out components of the light that emanate from areas that are outside of the focus area. Emission filters can be included in filter switching assembly 145, which can be selected to record a determined emission wavelength and to cut out any stray laser light.

In various examples, sample container 110 can include one or more substrates upon which the samples are provided. For example, in the case of a system to analyze a large number of different nucleic acid sequences, sample container 110 can include one or more substrates on which nucleic acids to be sequenced are bound, attached or associated. In various examples, the substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or other area at a plurality of locations formed in a matrix or array across the sample container 110.

Although not illustrated, a controller can be provided to control the operation of the scanning system. The controller can be implemented to control aspects of system operation such as, for example, focusing, stage movement, and imaging operations. In various applications, the controller can be implemented using hardware, software, or a combination of the foregoing. For example, in some implementations the controller can include one or more CPUs or processors with associated memory. As another example, the controller can comprise hardware or other circuitry to control the operation. For example, this circuitry can include one or more of the following: field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller can comprise a combination of this circuitry with one or more processors.

Although the systems and methods may be described herein from time to time in the context of this example system, this is only one example with which these systems and methods might be implemented. After reading this description, one of ordinary skill in the art will understand how the systems and methods described herein can be implemented with this and other scanners, microscopes and other imaging systems.

Figure 2:
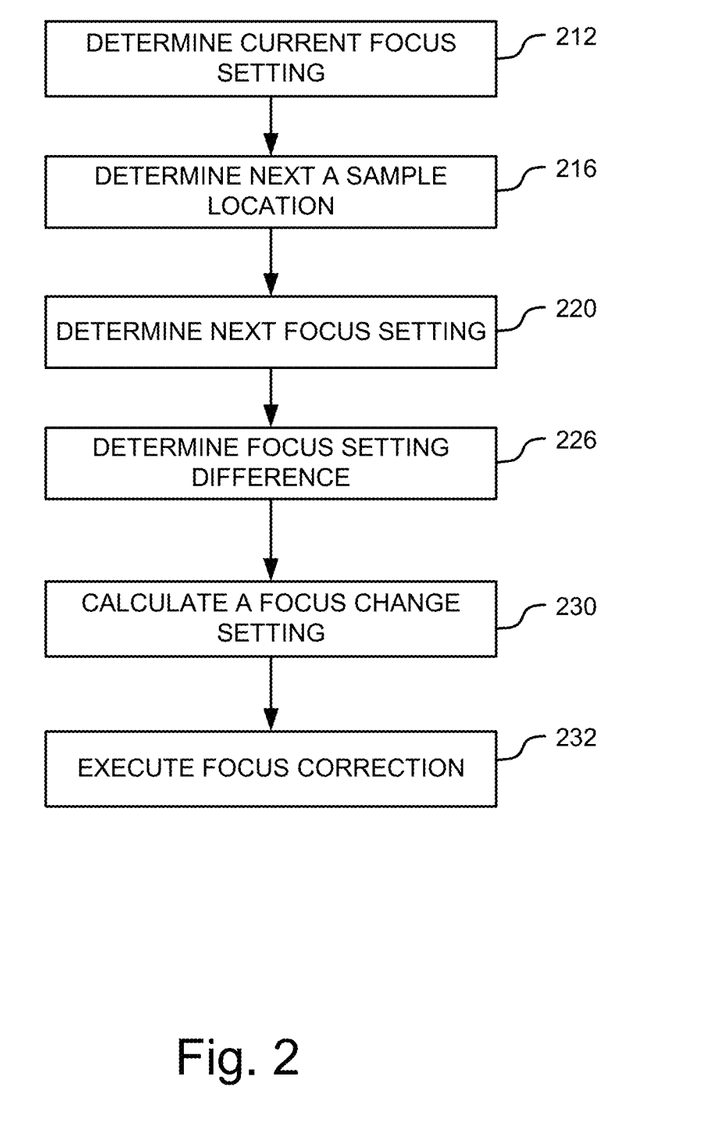
FIG. 2 is a diagram illustrating an example process for predictive focus tracking in accordance with one example of the systems and methods disclosed herein.

Examples of the technology disclosed herein provide systems and methods for predictive focus tracking to reduce latency in focusing. FIG. 2 is a diagram illustrating a process for predictive focus tracking in accordance with one example of the systems and methods disclosed herein. Referring now to FIG. 2, at operation 212, the system determines a current focus setting. For example, the system can be configured to determine the focus setting for a current imaging operation at a current sample location on a sample container. In various examples, this focus setting for the current sample location can be determined in advance (e.g. using the predictive methods described herein).

Generally, in operation, a focus beam generated by a focusing laser is reflected off of the sample location to measure the required focus, and the sample stage is moved relative to the optical stage to focus the optical stage onto a current sample location. The movement of the sample stage relative to the optical stage for focusing is generally described as movement along the z-axis or in the z direction. The terms "z-axis" and "z direction" are intended to be used consistently with their use in the art of microscopy and imaging systems in general, in which the z-axis refers to the focal axis. Accordingly, a z-axis translation results in increasing or decreasing the length of the focal axis. A z-axis translation can be carried out, for example, by moving a sample stage relative to an optical stage (e.g., by moving the sample stage or an optical element or both). As such, z-axis translation can be carried out by driving an objective lens, the optical stage, or the sample stage, or a combination of the foregoing, any of which can be driven by actuating one or more servos or motors or other actuators that are in functional communication with the objective lens or the sample stage or both. In various examples, the actuators can be configured to tilt the sample stage relative to the optical stage to, for example, effectively level the sample container on a plane perpendicular to the optical imaging axis. Where this dynamic tilting is performed to effectively level the sample locations on the sample container, this can allow the sample container to be moved in the x and y directions for scanning with little or no movement in the z-axis required.

At operation 216, the system determines the next sample location to which the optical stage will be positioned for imaging. This can be determined, for example, by the scanning algorithm that is used to move the sample stage relative to the optical stage (e.g., in the x and y directions). For example, in some applications the system moves from one sample location to the next adjacent sample location until all desired sample locations are imaged. In other applications, other scanning patterns may be implemented.

The system then determines the focus setting for this next sample location. This is illustrated at operation 220. As part of predictive focusing, the focus setting for this next sample location is determined in advance of the objective lens being positioned for imaging operations at the next sample location. Accordingly, in some examples the focus setting for the next sample location can be determined, for example, while the system is imaging the current sample location or before the system is positioned to image the current sample location. The focus setting for the next sample location may generally be determined using any of a number of different predictive focusing techniques. For example, the focus setting for the next sample location may be determined by using one or more off-axis look-ahead focus beams that are directed to the next location to determine the next location in advance. As another example of predictive focusing, one or more beams can be directed to the next or other future sample location, to previous sample locations (e.g., in the reverse scanning direction), to sample locations to the side of the current sample location (side relative to the scan travel direction, whether perpendicular to the direction of travel or at other angles) to gather focus information for various points in addition to or instead of the focus setting for the next immediate sample location.

As yet another example of predictive focusing, focus settings for a plurality of sample locations on a sample carrier may be determined in advance of the current scanning operation. These focus settings for each of the plurality of sample locations can be stored electronically in a history file for a given sample container and recalled when the sample container is reloaded into the imaging system for scanning operations. Predetermination of the sample-location focus settings for a sample carrier can be done in a set-up run, which may be run, for example, without any samples in place. Alternatively, the predetermination can be made during an operational scanning run of samples in the sample carrier and stored in the history file for future scanning operations. In various examples, image quality from previous runs can be checked and used to augment or update a previously stored focus model for the system. Where image quality from previous runs is high, this information can be used to rank the history file, or points on the history file at a relatively high confidence level.

At operation 226, the system determines the difference between the current focus setting and the next focus setting. This difference indicates the amount of change in the distance between the optical stage and the sample stage that will be required to bring the system into focus for the next sample location. The system uses this information at operation 230 to calculate a focus change setting. This difference in the focus setting from the current sample location to the next sample location provides an error signal that is used to determine a control output used to control the focus actuator in the focus component 175.

For example, the system may be implemented to determine parameters for a drive signal that will be applied to the actuator to move the optical stage relative to the sample stage for the next sampling operation. Generally, for a larger z-distance translation, or a greater slope, a greater control output (e.g., one or more parameters such as larger drive current, larger voltage, and greater duty cycle) will be specified. Likewise, for smaller translation distances or lesser slopes, a smaller control output (e.g., smaller drive current, lower voltage, and smaller duty cycle) will be specified. The control output can be adjusted, for example, by adjusting the current or voltage applied to the actuator. Additionally, in some examples, the time at which the drive signal is applied to the actuator can be adjusted based on the z-distance translation amount that is required for the change in focusing. For example, where the required distance is greater, the drive signal can be applied earlier. However, in other examples, the drive signal is applied as early as possible after the sampling is complete at the current location regardless of the difference in focus settings. In further examples, the drive signal can be supplied to multiple actuators at different output levels to tilt the sample instead of, or in addition to, moving the entire sample along the z-axis.

The parameters of the drive signal, and the time at which the drive signal is applied, can be determined based on the actuator type and drive requirements. For example, some actuators present a capacitive load and require that a certain level of charge be built up before the actuator is actuated. An example of such an actuator includes piezoelectric actuators. Other actuators, such as voice coil actuators for example, may present more of an inductive load. Such actuators have different characteristics dictating the requirements of the drive signal parameters.

At operation 232, the determined drive signal is applied to the actuator to execute the focus correction. In various examples, a drive signal with the determined parameters is provided to the actuator to drive the actuator to move the optical stage relative to the sample stage to bring the system into focus. In some examples, the actual focus adjustment applied to bring the sample into focus can be compared against the predictive focus model to ensure that the model is accurate. Likewise, image quality can be used to gauge the accuracy of the predictive focus model. These techniques can be used, for example, to ensure that noise in the system is not affecting the measurements. These techniques can also be used to refine the predictive focus algorithms. Where noise or other conditions are affecting the integrity of the predictive focusing model, this feature can be temporarily disabled until the condition is corrected.

As noted above, in some examples off-axis optical beams, such as, for example, laser beams, can be directed to the sample container (e.g. sample container 110) to determine focus settings for locations of the sample container other than the current sample location being sampled. For example, focus beams can be directed ahead of the current sample location (i.e., in the direction of the scanning) to measure the desired focus setting for one or more locations beyond the current sample location. In other examples, one or more beams can be directed in the forward, reverse or side directions to gather focus information for various points in addition to or instead of the focus setting for the next immediate sample location. These additional off-axis beams can be used to determine focus settings for multiple positions on the sample container (e.g., for other sample locations) and this information can be stored and used for predictive focus determination.

Figure 3:
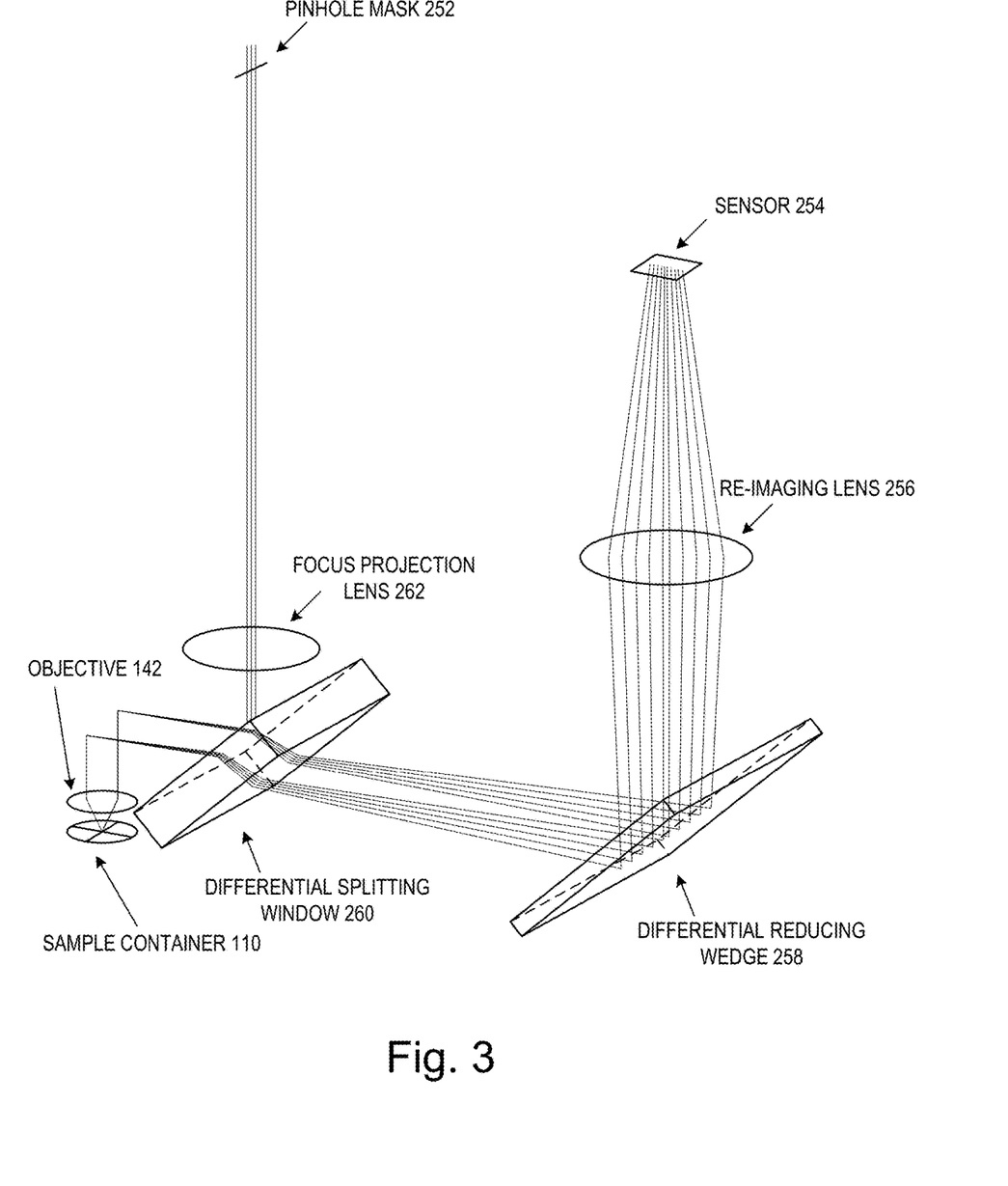
FIG. 3 is a diagram illustrating an example optical design for predictive focus tracking in accordance with one example of the systems and methods described herein.

FIG. 3 is a diagram illustrating an example optical design for predictive focus tracking in accordance with one example of the systems and methods described herein. Referring now to FIG. 3, this example system includes a sample container 110, which in this example is a flowcell, and an objective lens 142 that is used to focus light for imaging and for focusing on to the desired locations of the sample container 110. Also included in this example are a pinhole mask 252, an image sensor 254, a re-imaging lens 256, a differential reducing wedge 258, a differential splitting window 260, and a focus projection lens 262.

Figure 4A:
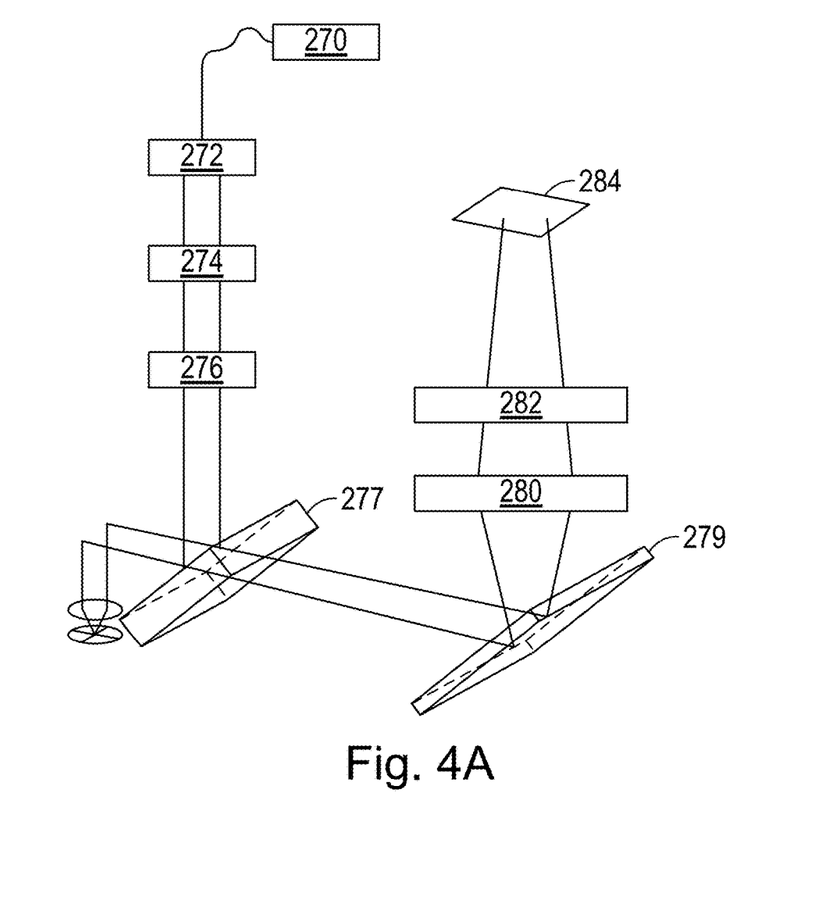
FIG. 4A is a diagram illustrating another example optical design for predictive focus tracking in accordance with one example of the systems and methods described herein.
Figure 4B:
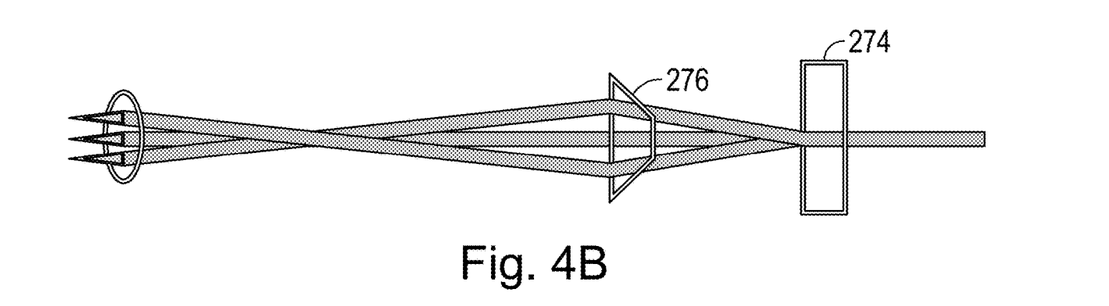
FIG. 4B is a diagram illustrating an alternative view of a portion of the optical system shown in FIG. 4A.

FIG. 4, which comprises FIGS. 4A and 4B illustrates another example optical system for predictive focus tracking as an alternative to that presented in FIG. 3. Particularly, FIG. 4A illustrates another example optical design for predictive focus tracking. FIG. 4B is a diagram illustrating an alternative view of a portion of the optical system shown in FIG. 4A. To avoid clutter and facilitate the reader's understanding, the example shown in FIG. 4A is illustrated with a single beam, which is the center beam in this case. One of ordinary skill in the art will appreciate how this system will operate with more than one beam such as, for example, with 3 beams as in FIG. 3. As described, a three-beam system can provide look-ahead and look-behind focus tracking.

Referring now to FIG. 4, laser 270 generates light for the focusing beams and is optically coupled into the system. Light from laser 270 can be coupled via a fiber for example to a beam splitter prism 272, such as a lateral displacement beam splitter. Filters may be included, if needed, such as for source selection. Prism 272 splits the transmit beam into two substantially parallel, spots of roughly equal intensity. This can be included to provide for differential measurement in the focusing model.

A diffraction grating 274 generates multiple copies of the input beams. In other examples, a beam splitter cube or multiple laser sources can be used to generate the multiple beams. In the case of a three-beam system, diffraction grating 274 may generate three output beams for each of the two input beams. An example of this for one input beam is shown at FIG. 4B. Because the diffraction grating can generate beams that are divergent (as also shown in FIG. 4B), a flat-top, or dove prism, 276 redirects the multiple beams. In some examples, the prism is configured such that the beams converge at the pupil of the objective lens 142 so the beams at the sample container are normal to the sample container. An example of this for a three-output-beam configuration is shown at FIG. 4B. The received signal from the sample container returns through the beam splitter 277 and reflects off mirror 279. Because each beam pair is diverging, receive prisms 280 and 282 consolidate the spots onto the focal plane of image sensor 284. In some examples, these can be implemented as dove and roof prisms to refract and aim the rays exiting the microscope object to fit on the image sensor array. A roof prism can be used to refract the return beams to consolidate the spots within a spot pair onto the focal plane of the image sensor, and a dove prism to refract the fore/aft spot pairs to consolidate all spot pairs onto the focal plane. With three-beam look-ahead, 3 beams pass through each of the two prism halves of the roof prism. However, in the other axis, the beams are diverging, which is why the dove prism is included to correct those.

In the various examples described above with reference to FIGS. 3 and 4, various optical components are implemented using prisms. Some or all of these may be implemented using lenses, however prisms may be desirable as these components are generally less sensitive to misalignment as compared to their lens counterparts. Prisms may also be more desirable than lens systems because prisms are generally more compact and include fewer elements.

Objective lens 142 in the examples of FIGS. 3 and 4 provides a generally circular field of view on the sample container. In one example, the center of the field of view is the current sample location being imaged. The direction of scan within that field of view is typically either the x or the y axis. For purposes of discussion, the direction of scan will be assumed to be in the y direction. A light source, such as an LED or laser light source (not illustrated) generates the focusing beams. In the illustrated example, three beams are used to provide a three-point differential off-axis predictive focus estimation—one beam for the current sample location and two additional beams for look-ahead and look-behind focus tracking. These two additional beams are used to determine the focus distance along the z axis between the optical stage and sample locations on the sample container.

In one example, one beam is directed toward current the sample location. As noted above, in this example the sample location of the sample currently being imaged is approximately at the center of the field of view of objective lens 142. Of the two additional focusing beams, one is directed along the y axis ahead of the scanning operation (i.e., in the +y direction) and the other is directed along the y-axis behind the current location (i.e., in the −y direction). In one example, the two additional beams are directed at locations at a distance that is approximately one-third of the distance from the center to the edge of the field of view ahead of and behind the current sample location. In other examples, a number of additional focusing beams other than two can be provided. For example, as indicated above, one or more beams, in addition to the center beam, can be directed at one or more of the +x, −x, +y, −y directions as well as in the +x, +y, +x, −y, −x, +y, −x, −y directions.

Information from these beams can be used to gather for information about multiple locations on the sample container (e.g., sample container 110). This information can be used, for example to gather and store focus settings for sample locations on the sample container at multiple sample locations. Focusing information obtained using these additional focus beams can also be used to compute the slope of the sample container in the region, which indicates the rate of change of the focus distance along the sample container. For example, in the case of a three-beam system, the system uses the known scanning direction to determine which of the additional beams is looking ahead and which is looking behind. Focus information from these two beams and from the center beam provides three points from which the slope of the sample container within this region can be calculated. If additional beams are included and directed to the side, slope can be determined in the x and y directions. The system can use the slope to predict focus changes in the forward direction and use this information to determine one or more parameters of the drive signal to be applied to drive the actuator. For example, the control output can be proportional to the slope detected in that region. Where the slope is greater, higher levels of current, for example, can be applied to allow the z stage to be more quickly moved into position for the next sample location. Whether the sample locations are locations along a continuous sample, or discrete locations on the sample container, this information about the focusing distance before the system is positioned to scan the next sample location allows the focus operation to be performed in a predictive manner.

In further examples, the slope information can further be used to level the sample container relative to the optical stage. This can be done, for example, by tilting the sample stage. With the sample stage level relative to the optical stage, scanning can progress in the x and y directions with little or no further adjustment in the z direction. Because the sample container may not be uniform across its area, this leveling can be done on a continuous or regular basis as scanning progresses to present a relatively level sample surface to the imaging system. In various examples, the leveling can be accomplished by providing three or more actuators, each driven independently to allow the sample stage to be tilted relative to the optical stage.

Figure 5:
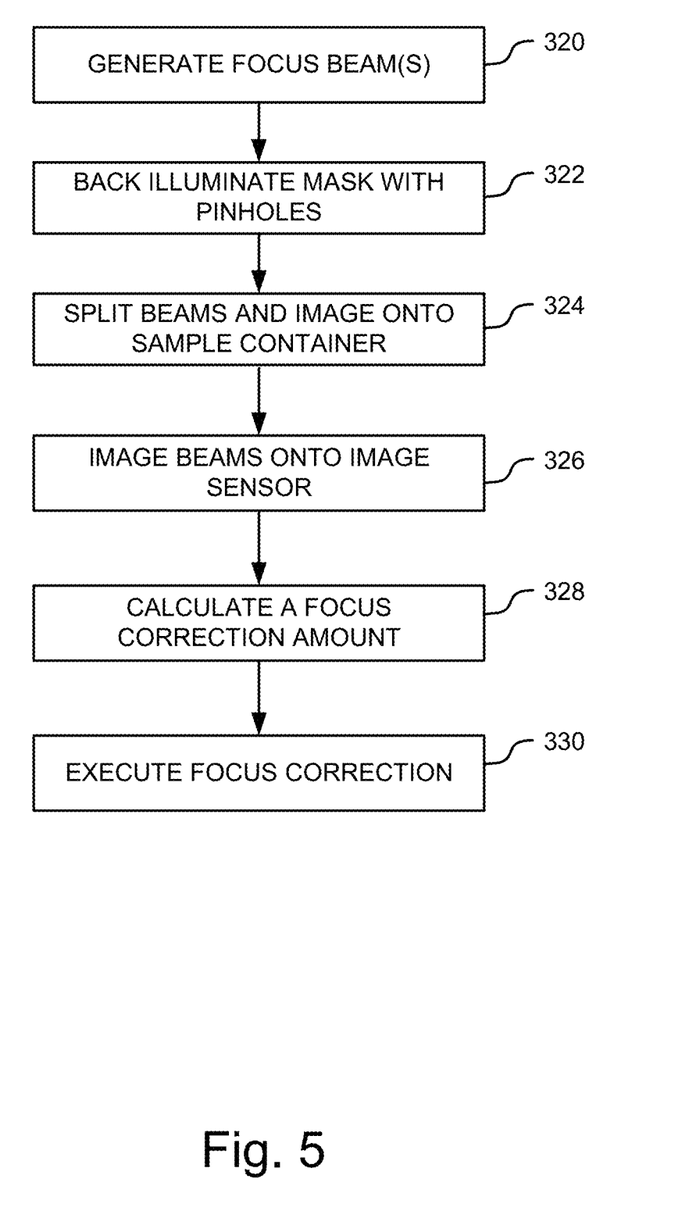
FIG. 5 is a diagram illustrating an example process for predictive focusing using an optical system such as the optical system shown in FIG. 3.

FIG. 5 is a diagram illustrating an example process for predictive focusing using an optical system such as the optical system shown in FIG. 3. The process illustrated in FIG. 5 is described in the context of FIG. 3 and in the context of the example three-point off-axis configuration, having a center focusing beam, a look-ahead beam and a look-behind beam. At operation 320, the light source (e.g., a laser or LED light source) generates the focusing light that will be used for the predictive focusing operations. In some applications light from the laser is coupled into a fiber and the output of the fiber is collimated. At operation 322, pinhole mask 252 is back illuminated (in the case of FIG. 3). In the example illustrated in FIG. 3, three pin holes are provided corresponding to the example three-point off-axis predictive focusing system.

In some imaging systems, it may be advantageous to split the focus beam into two beams and pass those beams through the edges of the objective lens 142. In this configuration, as the sample container 110 moves and the focusing beams bounce off the sample container 110, their angle changes. Because this configuration provides a longer lever arm, motion of sample container 110 results in a larger movement of the image on the camera. Therefore, changes in the Z direction can be much easier to detect on the image sensor. Accordingly, at operation 324 the three focusing beams are split into six beams. In the example illustrated in FIG. 3, focus projection lens 262 projects the three beams onto differential splitting window 260, and differential splitting window 260 splits them into six beams—two for the center beam, and to each for the look-ahead and look-behind beams. Accordingly, in some examples, the focus beam and the additional look-ahead/look-behind/look-aside beams can be split into two beams each. In the above example where there is one center beam, one look-ahead beam and one look-behind beam, these three beams would be split into six separate beams.

At operation 324 the pin holes are imaged onto sample container 110. In the example illustrated in FIG. 3, these beams are split by a differential splitting window 260 into two beams each, creating a total of six beams. Differential splitting window 260 can be implemented as a diffraction grating to split each focusing beam thereby creating multiple beams for each focusing beam. Because the beams from a diffraction grating are typically diverging, a lateral displacement prism (not illustrated in FIG. 3) can be included to cause those beams to converge at the entrance pupil of the objective lens 142. Objective lens 142 images these beams onto sample container 110. As described above, the beams can be imaged as a center beam, a look-ahead beam and a look-behind beam.

At operation 326, reflections from these beams are imaged onto the image sensor. Because these beams may be diverging and therefore not fall within the area of the image sensor, differential reducing wedge 258 and re-imaging lens 256 can be provided to focus and place the spots one to the image sensor.

At operation 328, the focus correction amount can be calculated from the beams imaged onto the input sensor. As noted above, focus information from points within the field of view of the objective lens can be calculated and used to determine focus correction amounts. For example, focus information from the three beams can be used to calculate a slope of the sample container along the sample locations. The slope can be used to compute one or more drive signal parameters (e.g. the current level, voltage level, duty cycle, on-time, etc.) to drive the actuator to adjust the sample stage relative to the optical stage for the next sample location. At operation 330, the focus correction is executed by providing the determined one or more drive signal parameters at the appropriate level to the actuator.

Although not illustrated in FIG. 3 or 4, one of ordinary skill in the art will appreciate after reading this description that a controller can be included to control the operations of the predictive focus tracking. In some examples, a processor system having one or more processors executing program code to control the operations of the system can be used. However, for high-speed systems it may be advantageous to use a hardware solution to control the operations of the system such as by using one or more of the following: FPGA, ASIC, PLD, CPLD, PLA, PAL, or other like circuitry.

Figure 6:
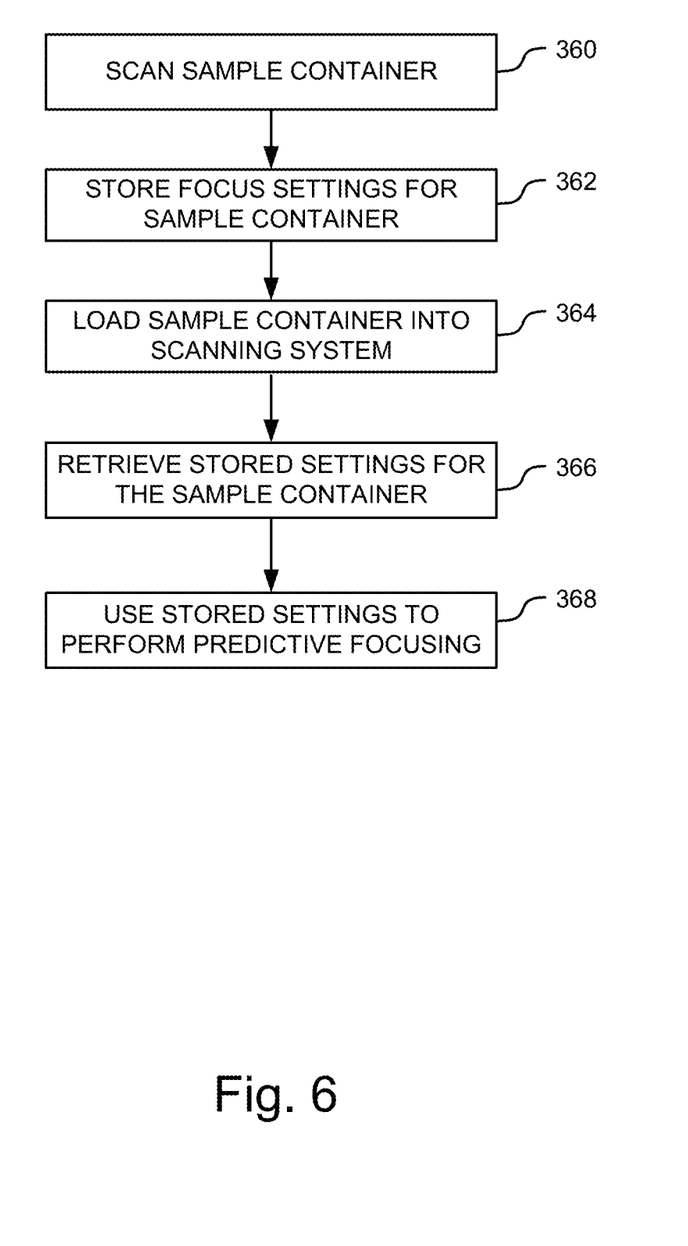
FIG. 6 is a diagram illustrating an example process for predictive focus tracking using stored information in accordance with one example of the systems and methods described herein.

Yet another approach to predictive focus tracking, as noted above, uses stored information about focus settings of a given sample container to control focusing of the system during real-time operation. For example, a sample container can be scanned and focus settings determined for each of the plurality of sample locations on the sample container. FIG. 6 is a diagram illustrating an example process for predictive focus tracking using stored information in accordance with one example of the systems and methods described herein. With reference now to FIG. 6, at operation 360, a sample container (e.g. sample container 110) is scanned. During this scanning operation, focus settings for each of a plurality of sample locations on the sample container are measured. For sample containers having discrete sample locations, the focus amount can be measured at each of these discrete locations. For sample containers having a continuous sample, focus settings can be measured at each of a plurality of locations across the container, where the quantity of locations and spacing between these locations can be determined based on the resolution desired for the sample scan. At operation 362, the focus settings for the sample container are stored. These can be stored electronically in a history file in memory so that they can be recalled for later use during scanning operations. The history file or the information therein can be tagged to be identified as containing the focus information for that particular sample container.

At operation 364 a sample container is loaded into the scanning system for scanning operations. For actual imaging operations, the sample container will include a sample or samples to be imaged. The sample container can include an identifier to uniquely identify the sample container. In some examples, sample containers can be identified by class while in other examples, sample containers can be identified individually. The sample container identification can be entered into the system by a user, or it can be optically or electronically detected when the sample container is loaded into the system.

At operation 366, stored focus settings for the identified sample container are retrieved. In this operation, the identification of the sample container can be used to identify the file that contains the stored focus settings for that sample container. With the proper history file identified, at operation 368 the stored settings contained in that file can be used to perform predictive focusing operations for the scan being conducted with that sample container. For example, slope information can be computed using the focus settings stored in the history file, and this slope information can be used to determine the parameters of the drive signal applied to the actuator during imaging operations.

Figure 7:
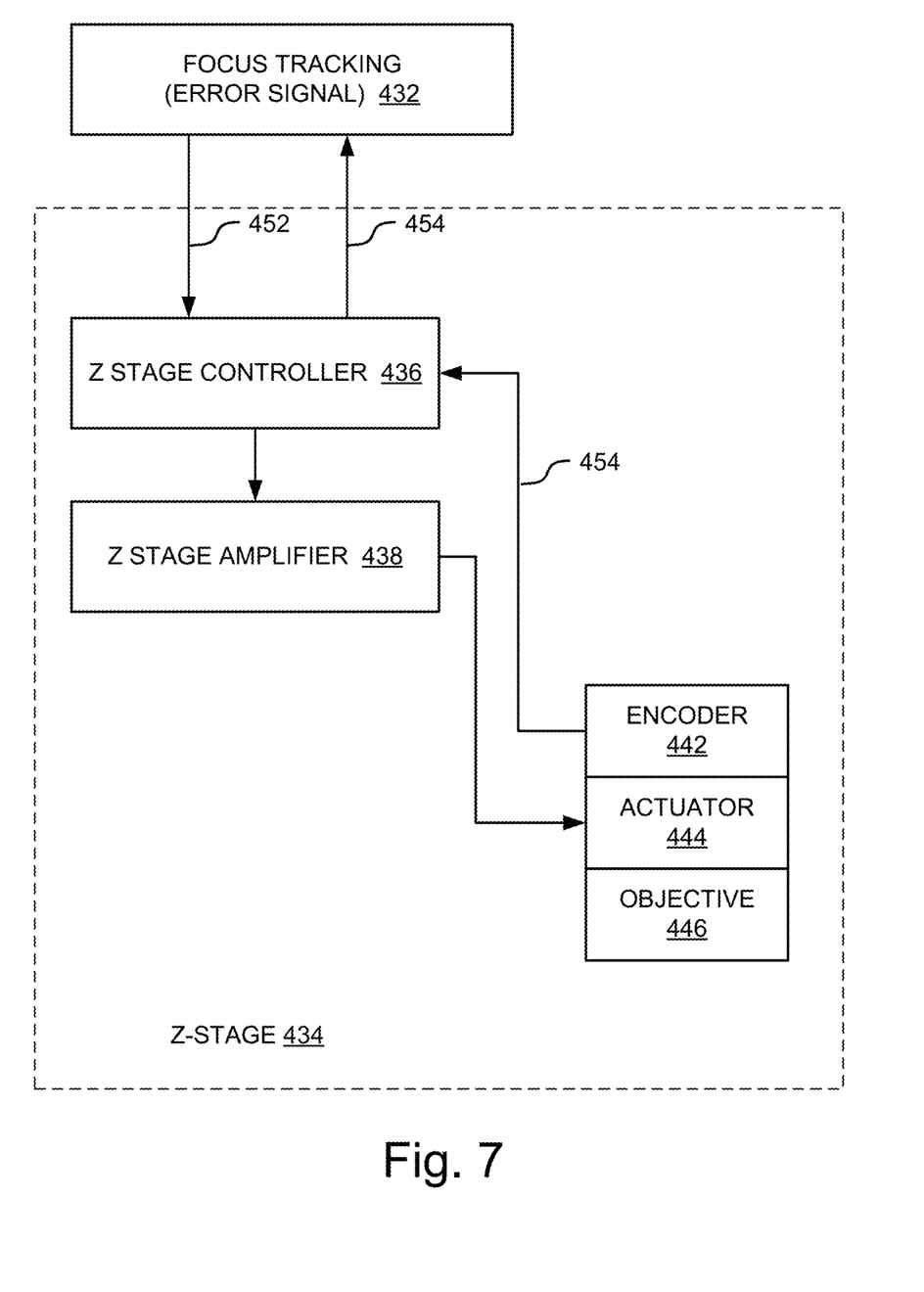
FIG. 7 is a block diagram illustrating an example focus control system for focus tracking in accordance with one example of the systems and methods described herein.

In the examples described above, predictive focus information is used to determine a difference between a focus setting for a current sample location and a focus setting for a future location. This difference, which can be in the form of an error signal, is used to generate a drive signal having the appropriate signal parameters to drive the actuator, which moves to the stage being driven. FIG. 7 is a block diagram illustrating an example focus control system for focus tracking in accordance with one example of the systems and methods described herein. This example focus control system includes focus tracking circuitry 432 that is configured to determine the current and look ahead focus settings that are used to generate the drive signal that drives the focus tracking feedback loop in the z stage 434. As illustrated in the example of FIG. 7, commands 452, based on the focus settings difference, are fed to the z-stage 434.

In this example, the Z stage 434 is configured to move the objective lens 446 (e.g., objective lens 142). Actuator 444 moves the optical stage, and in particular the objective lens 446, in response to the drive signal provided by the Z-stage amplifier 438. As noted above, actuator 444 can include a piezoelectric actuator, a voice coil actuator, a motor, or other like actuators. An encoder 442 provides information about the actuator position and its movement. This encoder information 454 can be fed back through the z-stage controller 436 to focus tracking circuitry 432 and can be used in determining the error signal.

Figure 8:
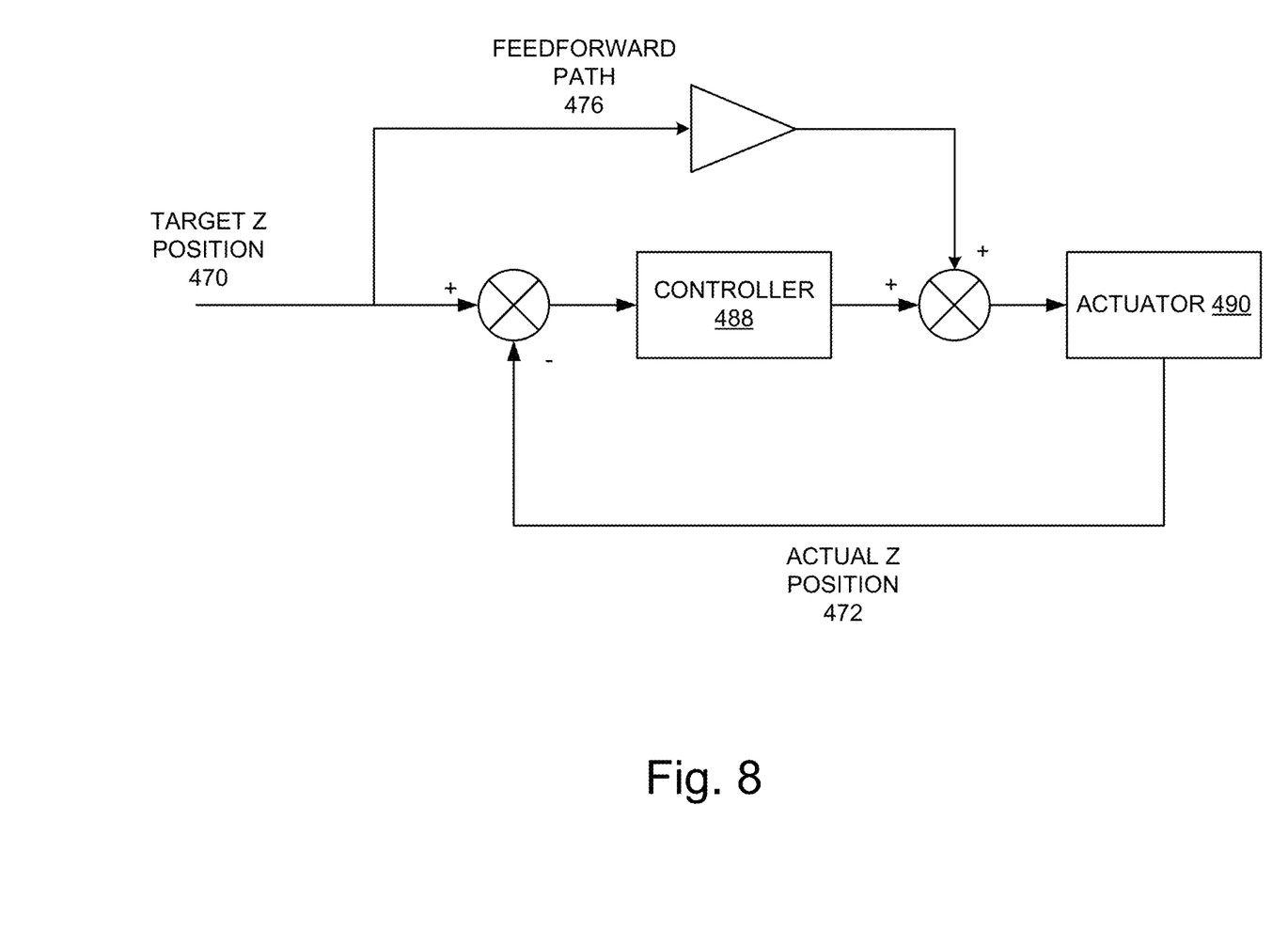
FIG. 8 is a diagram illustrating an example architecture for a z-stage controller in accordance with one example of the systems and methods described herein.

FIG. 8 is a diagram illustrating an example architecture for a z-stage controller in accordance with one example of the systems and methods described herein. This example controller incorporates both feedforward and feedback control to generate the drive signal to control the stage actuator. In other examples, this can be implemented as a proportional, integral and derivative (PID) control for both the error signal and the feedforward control branches of the control system. As illustrated in this example, the difference between the target focus setting (Target Z Position 470) and the actual focus setting (Actual Z Position 472) are computed and fed to control block 488. Position information is also sent via feedforward path 476 and added to the output signal of control block 488. This output signal from drive circuitry within the control block 488 provides the control output signal, which is used to drive actuator 490. As shown, the magnitude of the difference between the target focus position and the current actual position is provided via the feedforward path 476 to adjust the control output signal.

Figure 9:
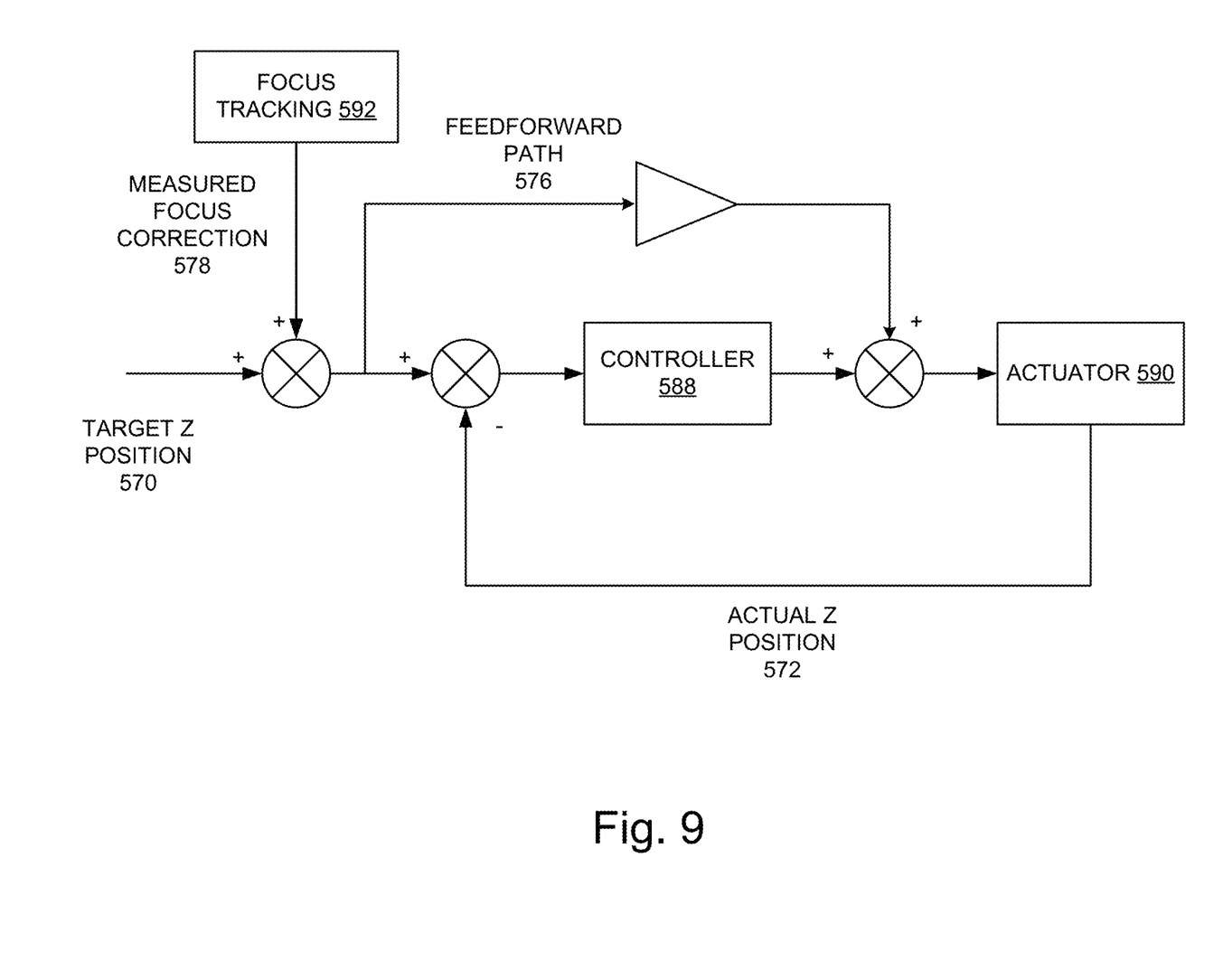
FIG. 9 is diagram illustrating another example architecture for a z-stage controller in accordance with one example of the systems and methods described herein.

FIG. 9 is diagram illustrating another example architecture for a z-stage controller in accordance with one example of the systems and methods described herein. This example also incorporates feedback and feedforward control. In operation, the target focus setting (e.g., target z position 570) is used to command the position of the stage. The target z position 570 is provided to controller 588, which determines the drive signal needed to command actuator 590 to position the stage. Controller 588 may also include drive circuitry to generate the drive signal. The drive signal determination is made using the magnitude of the difference between the target focus setting (target z position 570) and the current focus setting (actual z position 572) which can be provided, for example, by actuator 590. In this example, as well as in the previous example, the drive signal used to drive the actuator is adjusted by the signal from the feedforward control path 576. However, in the example of FIG. 9, measured focus correction signal 578 is generated by focus tracking circuitry 592. The correction information can be determined, for example, using the lookahead predictive focus tracking or predictive focus tracking based on history data as described above, or using other predictive focus tracking techniques. The correction information is added to the commanded stage position to adjust the drive signal according to the slope of the change in the focus setting for scanning operations.

As noted above, in various examples an actuator can be used to position the sample stage relative to the optical stage by repositioning either the sample stage or the optical stage (or parts thereof), or both to achieve the desired focus setting. In some examples, piezoelectric actuators can be used to move the desired stage. In other examples, a voice coil actuator can be used to move the desired stage. In some applications, the use of a voice coil actuator can provide reduced focusing latency as compared to its piezoelectric counterparts. Where a voice coil actuator is used, coil size may be chosen as a minimum coil size necessary to provide the desired movement such that the inductance in the coil can also be minimized. Limiting coil size, and therefore limiting its inductance, provides quicker reaction times and requires less voltage to drive the actuator.

As described above, regardless of the actuator used, focus information from points other than a current sample location can be used to determine the slope or the magnitude of change in the focus setting for scanning operations. This information can be used to determine whether to feed the drive signal to the actuator earlier and how to set the parameters of the drive signal. Additionally, in some examples the system can be pre-calibrated to allow drive thresholds to be determined for the actuator. For example, the system can be configured to supply to the actuator drive signals at different levels of control output to determine the highest amount of control output (e.g., the maximum amount of drive current) the actuator can withstand without going unstable. This can allow the system to determine a maximum control output amount to be applied to the actuator.

While various examples of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various examples be implemented to perform the recited functionality in the same order unless the context dictates otherwise.

Although the disclosed technology is described above in terms of various example examples and implementations, it should be understood that the various features, aspects and functionality described in one or more of the individual examples are not limited in their applicability to the particular example with which they are described, but instead can be applied, alone or in various combinations, to one or more of the other examples of the disclosed technology, whether or not such examples are described and whether or not such features are presented as being a part of a described example. Thus, the breadth and scope of the technology disclosed herein should not be limited by any of the above-described example examples. It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. The term comprising is intended herein to be open-ended, including not only the recited elements, but any additional elements as well. Likewise, where this document refers to technologies that would be apparent or known to one of ordinary skill in the art, such technologies encompass those apparent or known to the skilled artisan now or at any time in the future.

The term "coupled" refers to direct or indirect joining, connecting, fastening, contacting or linking, and may refer to various forms of coupling such as physical, optical, electrical, fluidic, mechanical, chemical, magnetic, electromagnetic, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the elements or functionality described or claimed as part of the component are all configured in a common package. Indeed, any or all of the various elements of a component, including structural elements, can be combined in a single package or separately maintained and can further be distributed in multiple groupings or packages.

Additionally, the various examples set forth herein are described in terms of example diagrams and other illustrations. As will become apparent to one of ordinary skill in the art after reading this document, the illustrated examples and their various alternatives can be implemented without confinement to the illustrated examples. For example, block diagrams and their accompanying description should not be construed as mandating a particular architecture or configuration.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

We claim:

1. An imaging system, comprising:
   a sample stage comprising a surface to support a sample container, the sample container including a sample having a plurality of sample locations;
   an optical stage to image the sample at the plurality of sample locations;
   one or more actuators physically coupled to at least one of the sample stage and the optical stage to move the sample stage relative to the optical stage to focus the optical stage onto a current sample location of the plurality of sample locations;
   a first light source to illuminate the current sample location;
   a second light source to project a pair of spots on a future sample location of the plurality of sample locations while the first light source is illuminating the current sample location or before at least one of the optical stage and the sample stage is positioned to image the sample at the future sample location; and
   a controller to determine, based on an image of the pair of spots projected on the future sample location, a focus setting for the future sample location.

2. The imaging system of claim 1, wherein the first light source is to illuminate fluorescent sequencing reactions within nucleic acid sequences at the current sample location.

3. The imaging system of claim 2, wherein the sample container is a flowcell.

4. The imaging system of claim 2, further comprising a camera to track sequencing of the sample container.

5. The imaging system of claim 1, wherein the controller is further configured to provide, based on the focus setting for the future sample location, a drive signal to the one or more actuators before the optical stage is positioned to image the sample at the future sample location.

6. The imaging system of claim 5, wherein the controller is further configured to determine at least one parameter of the drive signal using a difference between a focus setting for the current sample location and the focus setting determined for the future sample location.

7. The imaging system of claim 5, wherein the one or more actuators are physically coupled to the sample stage to move, in response to the drive signal, the sample stage to adjust a distance between the sample stage and the optical stage.

8. The imaging system of claim 5, wherein the one or more actuators are physically coupled to the optical stage to move, in response to the drive signal, the optical stage to adjust a distance between the sample stage and the optical stage.

9. The imaging system of claim 8, wherein the optical stage comprises an objective lens that is moved in response to the drive signal.

10. The imaging system of claim 5, wherein the one or more actuators are physically coupled to the sample stage to adjust, in response to the drive signal, a tilt of the sample stage.

11. The imaging system of claim 1, wherein the one or more actuators comprise a piezoelectric device, a voice coil, or a drive motor.

12. The imaging system of claim 1, wherein the second light source is to project the pair of spots on the future sample location of the plurality of sample locations while the first light source is illuminating the current sample location.

13. The imaging system of claim 1, wherein the second light source is to project the pair of spots before at least one of the optical stage and the sample stage is positioned to image the sample at the future sample location.

14. The imaging system of claim 1, wherein the second light source comprises:
a laser that emits a light beam; and
a beam splitter that splits the light beam into two light beams, wherein the pair of spots corresponds to the two light beams.

15. A method, comprising:
determining a first focus position of a sample stage for a current sample location of a sample in a sample container being sequenced;
moving, using one or more actuators, the sample stage relative to an optical stage to focus the optical stage onto the current sample location;
illuminating, using a first light source, the current sample location;
imaging, using the optical stage, the current sample location;
projecting, using a second light source, a pair of spots on a future sample location of the sample while the first light source is illuminating the current sample location or before at least one of the optical stage and the sample stage is positioned to image the sample at the future sample location; and
determining, based on an image of the pair of spots projected on the future sample location, a second focus position of the sample stage for the future sample location.

16. The method of claim 15, wherein illuminating the current sample location, comprises: illuminating fluorescent sequencing reactions within nucleic acid sequences at the current sample location.

17. The method of claim 15, further comprising: moving, based on at least the second focus position, using the one or more actuators, the sample stage relative to the optical stage to focus the optical stage onto the future sample location.

18. The method of claim 17, wherein moving the sample stage relative to the optical stage to focus the optical stage onto the future sample location, comprises: providing a drive signal to the one or more actuators, the drive signal determined using at least the first focus position and the second focus position.

19. The method of claim 18, wherein:
the one or more actuators are physically coupled to the optical stage; and
moving the sample stage relative to the optical stage to focus the optical stage onto the future sample location, comprises: moving, in response to the drive signal, the optical stage to adjust a distance between the sample stage and the optical stage.

20. The method of claim 18, wherein:
the one or more actuators are physically coupled to the sample stage; and
moving the sample stage relative to the optical stage to focus the optical stage onto the future sample location, comprises: moving, in response to the drive signal, the sample stage to adjust a distance between the sample stage and the optical stage.

* * * * *